United States Patent [19]

Fujiwara et al.

[11] Patent Number: 5,459,389
[45] Date of Patent: Oct. 17, 1995

[54] DUAL-CHARGING SYSTEM FOR A PORTABLE ELECTRIC APPLIANCE

[75] Inventors: Mitsuru Fujiwara; Atsushi Isaka, both of Shiga, Japan

[73] Assignee: Matsushita Electric Works, Ltd., Osaka, Japan

[21] Appl. No.: 257,028

[22] Filed: Jun. 8, 1994

[30] Foreign Application Priority Data

Sep. 3, 1993 [JP] Japan .................... 5-220166

[51] Int. Cl.⁶ .................................................. H02J 7/00
[52] U.S. Cl. ........................................................ 320/2
[58] Field of Search ............................... 320/2, 5, 6, 15, 320/17; 455/89, 90

[56] References Cited

U.S. PATENT DOCUMENTS

| | | | |
|---|---|---|---|
| 4,922,178 | 5/1990 | Matuszewski et al. | 320/2 |
| 5,396,162 | 3/1995 | Brilmyer | 320/2 |

FOREIGN PATENT DOCUMENTS

| | | | |
|---|---|---|---|
| 5336612 | 12/1993 | Japan | 320/2 |

*Primary Examiner*—Kristine L. Kincaid
*Attorney, Agent, or Firm*—Stevens, Davis, Miller & Mosher

[57] ABSTRACT

A dual-charging system for a portable electric appliance such as a video camera comprises a rechargeable battery pack having a built-in charge circuit and a separate charger unit. The battery pack is capable of selectively taking a first charging operation with the use of the built-in charge circuit and a second charging operation with the use of a charge circuit of the charger unit. The charge circuit of the charger unit is designed such that a charging rate of the battery pack by the second charging operation is faster than that by the first charging operation. Therefore, when a rapid charging of the battery pack is desired, it is preferred to select the second charging operation. On the other hand, when the electric appliance is used, for example, during a journey, it is preferred to select the first charging operation because the charger unit is inconvenient to carry during a journey.

9 Claims, 6 Drawing Sheets

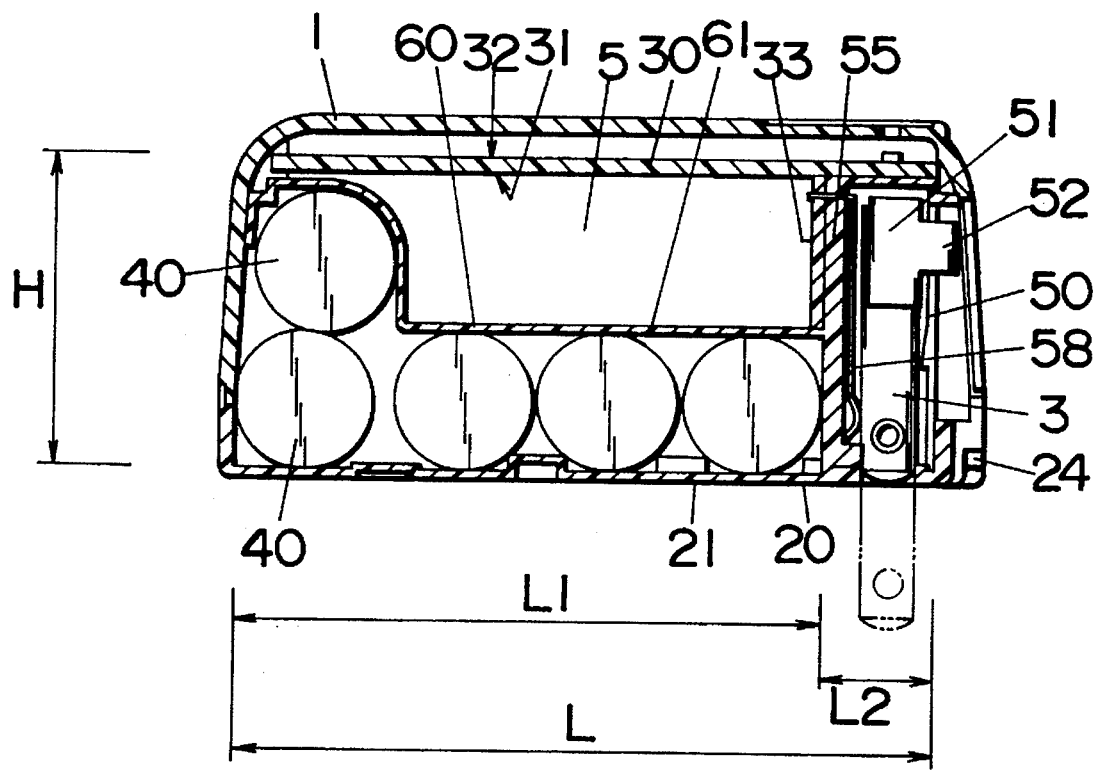

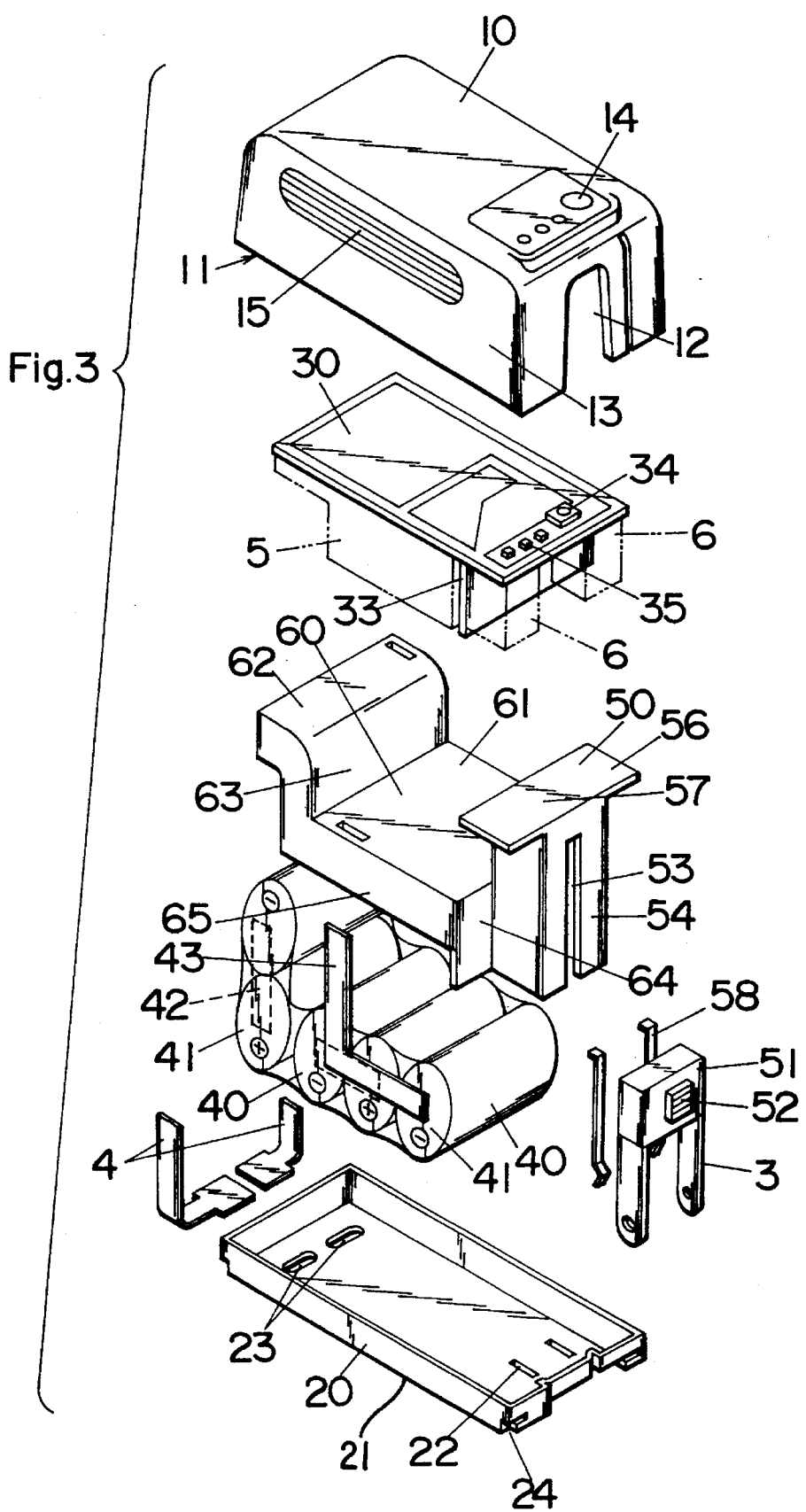

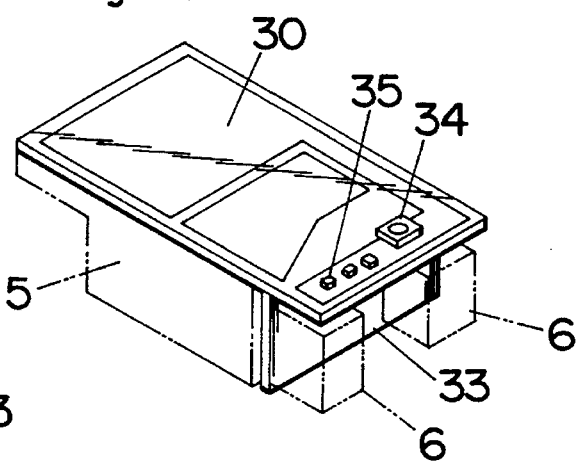
Fig.4A
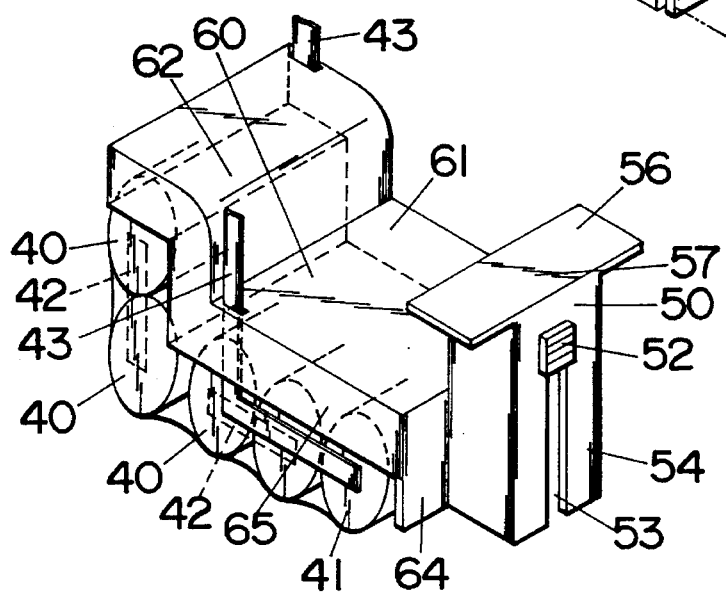
Fig.4B
Fig.5
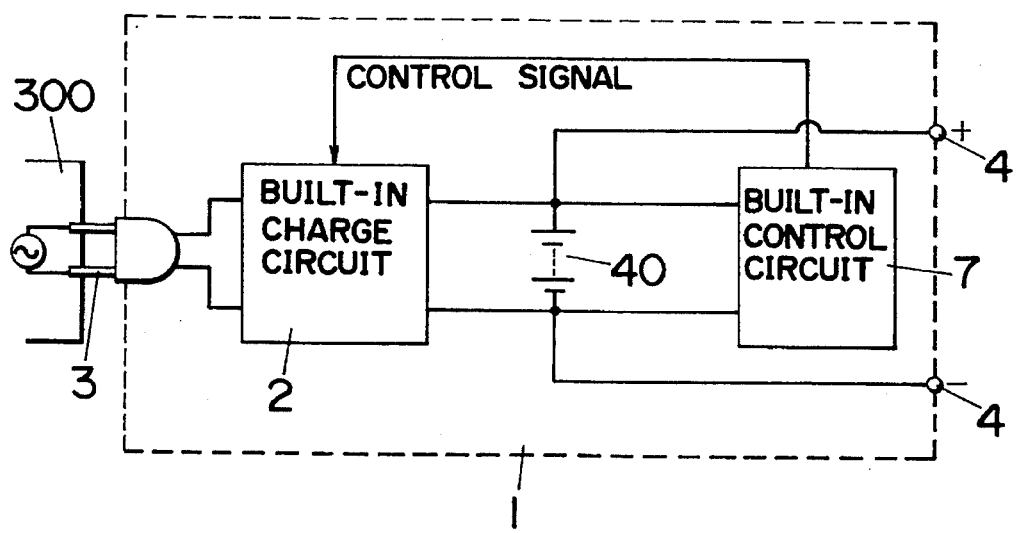

DUAL-CHARGING SYSTEM FOR A PORTABLE ELECTRIC APPLIANCE

BACKGROUND OF THE INVENTION

1. Field of the Invention

The present invention relates to a dual-charging system for a portable electric appliance such as a video camera, which comprises a rechargeable battery pack and a separate charger unit, and is capable of selectively taking a first charging operation with the use of a built-in charge circuit of the battery pack and a second charging operation with the use of a charge circuit of the charger unit.

2. Disclosure of the Prior Art

A rechargeable battery is used for a portable electric appliance such as a video camera. For example, a handy video camera is powered by a rechargeable battery pack which is removably fitted to the video camera to supply an electric current thereto. Since the battery pack does not have a charge circuit so as to have a light-weight and compact design of the video camera, it is generally charged by the use of a separate battery charger. As a result, when the video camera is used during a journey, the battery charger has to be carried together with the video camera for performing a charging operation of the battery pack. Though the battery pack is handy to carry because it can be fitted to the video camera, the battery charger is not convenient to carry during a journey.

SUMMARY OF THE INVENTION

For avoiding the above problem, a primary object of the present invention is to provide a dual-charging system for a portable electric appliance, which comprises a battery pack and a separate charger unit, and is capable of selectively taking a first charging operation with the use of a first charge circuit of the battery pack and a second charging operation with the use of a second charge circuit of the separate charger unit. That is, the battery pack is adapted to removably fit to the electric appliance for energizing the appliance. The battery pack comprises a housing which incorporates at least one rechargeable cell, a first charge circuit with a first terminal, and a retractable plug adapted to connect to an AC mains for supplying an electric current to the first charge circuit to perform the first charging operation. The first terminal is adapted to connect to the appliance for supplying an electric current thereto from the rechargeable cell. Since the battery pack of the present invention can be charged by the first charging operation without using the separate charger unit, it is not always necessary to carry the charger unit together with the appliance and the battery pack during a journey.

In addition, the battery pack of the present invention can be detachably mounted on the charger unit to perform the second charge operation. The charger unit includes a second charge circuit which is adapted to connect to a power source so as to supply an electric current therefrom to the second charge circuit. The second charge circuit has a second terminal which is adapted to connect to the first terminal of the battery pack when the battery pack is mounted to the charger unit for the second charging operation. Since it is possible to design the second charge circuit so as to produce a charge current greater than the first charge circuit, it is preferred to perform the second charging operation when a rapid charging operation of the rechargeable cell is desired.

In a preferred embodiment of the present invention, the housing of the battery pack has a mounting face which is placed upon the electric appliance and the charger unit respectively when the battery pack is mounted on the electric appliance and the charger unit. Since the retractable plug and the first terminal are connected to the mounting face so as to be accessible through the mounting face, it is possible to safely perform the first and second charging operations without exposing the plug and first terminal.

In a further preferred embodiment of the present invention, the retractable plug is supported to a holder accommodated in one side of the housing of the battery pack so as to project therefrom and retract therein. In addition, a circuit board is disposed within the housing to carry a plurality of components forming the first charge circuit. A plurality of rechargeable cells are accommodated within the housing in a L-shaped arrangement in such a manner as to leave within the housing a space which is confined by the rechargeable cells, the circuit board, and the holder. The components of the first charge circuit are accommodated in the space. When the battery pack of the present invention has the above described structure, it is possible to safely use the battery pack without causing an accidental short circuit within the housing.

For a more complete understanding of the present invention and its construction and advantages, reference should be made to the following description and to the drawings.

BRIEF DESCRIPTION OF THE DRAWINGS

FIG. 2 is a cross-sectional view of the battery pack;

FIG. 3 is an exploded perspective view of the battery pack;

FIGS. 4A and 4B are perspective views of a main circuit board mounting an auxiliary circuit board thereon, and an assembled state of a cell case, a plurality of rechargeable cells and a prong case of FIG. 3, respectively;

FIG. 5 is a circuit diagram for understanding a first charging operation of the battery pack;

DESCRIPTION OF THE PREFERRED EMBODIMENT

Figure 1A:
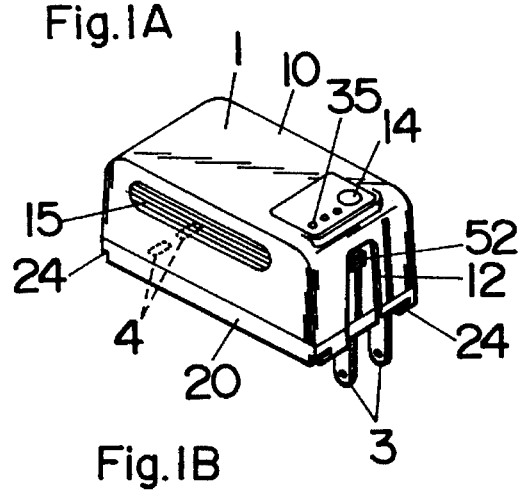
FIGS. 1A to 1C are perspective views of a battery pack and a separate charger unit of a dual-charging system of the present invention for a portable electric appliance, and a handy video camera as the electric appliance, respectively.
Figure 1B:
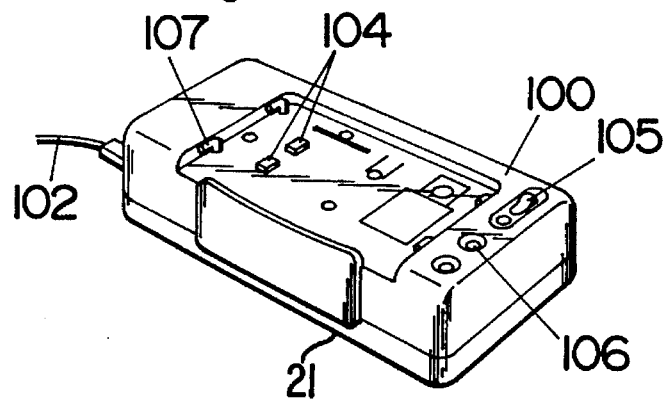
Figure 1C:
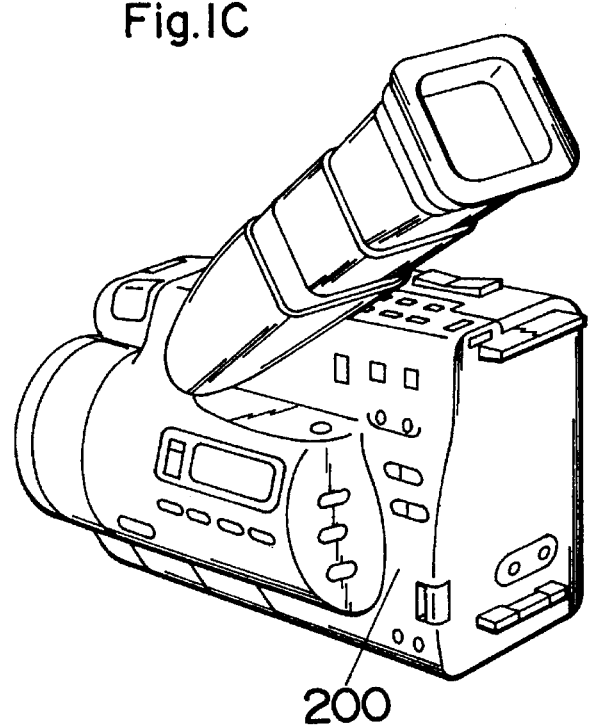

As shown in FIGS. 1A–1C, a dual-charging system of the present invention for a portable electric appliance such as a video camera 200 comprises a battery pack 1 having a built-in charge circuit and a separate charger unit 100. The battery pack 1 is capable of selectively taking a first charging operation with the use of the built-in charge circuit thereof and a second charging operation with the use of a charge circuit of the charger unit 100.

As shown in FIGS. 2, 3, 4A and 4B, the battery pack 1 has a rectangular housing 10 having a bottom opening 11, and a bottom cover 20 for covering the bottom opening 11. The housing 10 incorporates a plurality of rechargeable cells 40 (see FIG. 2), a main circuit board 30 (see FIG. 3), for mounting thereon circuit parts (not shown) of the built-in charge circuit, a pair of retractable prongs 3 adapted to connect to a conventional female power supply receptacle of an AC mains, and a pair of terminal members 4 applied to the second charging operation.

In this embodiment, five rechargeable cells 40 are incorporated within the housing 10, and each of the rechargeable cells 40 is in a cylindrical form. The rechargeable cells 40 are integrally packed within a cell case 60 in an L-shaped arrangement, as shown in FIG. 2. The cell case 60 is made of an insulating material, for example, a plastic or synthetic resin. Adjacent cell terminals 41 are of opposite polarity and are electrically interconnected in series by welded conductive straps 42. In addition, the cell terminals 41 and the conductive straps 42 are protected by an insulating paper(not shown) for preventing an accidental short circuit thereof. Both end terminals 41 of the thus interconnected rechargeable cells are connected to a circuit pattern on the main circuit board 30 by a pair of lead members 43. The insulation paper is also useful for preventing a contact of 10 the lead member 43 with the conductive strap 42. The cell case 60 is composed of a base 61, a rounded top wall 62, a vertical wall 63 extending between one end of the base 61 and the rounded top wall 62, a depending end wall 64 from the opposite end of the base 61, and a flange 65. A radius of curvature of the rounded top wall 62 is substantially equal to a radius of the rechargeable cell 40.

In the L-shaped arrangement of the rechargeable cells 40, when there are "n" number (n=5 in this embodiment) of the rechargeable cells 40 in all, "n−1" of the rechargeable cells are horizontally arranged within the housing and the other of the rechargeable cells 40 is placed above one of the end cells of the arranged rechargeable cells within the cell case 60 such that a longitudinal axis of each rechargeable cell 40 is substantially parallel with that of the adjacent cell 40, as shown in FIG. 3. Therefore, a length L1 of the cell case 60 is about "n−1" times the diameter of the rechargeable cell 40, as shown in FIG. 2.

The retractable prongs 3 are capable of being selectively pulled out to an extended form thereof for plugging the prongs 3 into a female power supply receptacle during the first charging operation, as shown by a dotted line in FIG. 2, and a retracted form as shown in solid lines for accommodating the prongs 3 in a prong case 50. The prongs 3 are fixed to a terminal block 51 made of an insulating material, as shown in FIG. 3. The terminal block 51 is provided with an adjusting knob 52 which is projected through a slit 53 formed in a front wall 54 of the prong case 50, as shown in FIG. 4B. The adjusting knob 52 can be moved upwardly and downwardly along the slit 53 to obtain the extended form and reduced form of the prongs 3. The prong case 50 is disposed within the housing 10 so as to be adjacent to the depending end wall 64 of the cell case 60 and the adjusting knob 52 and such that a side opening 12 of the housing 10 is covered with the front wall 54 of the prong case 50. The prongs 3 in the extended form are projected downwardly from a pair of prong holes 22 of the bottom cover 20. A length L2 of the prong case is substantially equal to the diameter of the rechargeable cell 40. Therefore, a total length L of the housing 10 is about "n" times as long as the diameter of the rechargeable cell, as shown in FIG. 2. A height H of the housing 10 is about twice as long as the diameter of the rechargeable cell 40.

Relatively large circuit parts(not shown) for the built-in charge circuit, for example, a condenser and transformer, etc., are mounted on a lower surface 31 of the main circuit board 30. For efficiently using a space within the housing 10, an auxiliary circuit board 33 is fixed on the lower surface 31 of the main circuit board 30 so as to be in a substantially perpendicular relation with the main circuit board 30. A circuit room 5 accommodating the large circuit parts is defined within the housing 10 as a space surrounded by the lower surface 31 of the main circuit board 30, the base 61 and vertical wall 63 of the cell case 60, a rear wall 55 of the prong case 50, and a side wall 13 of the housing 10. On the contrary, relatively small circuit parts(not shown), for example, a transistor and IC chip, etc., are surface-mounted on an upper surface 32 of the main circuit board 30. In addition, it is preferred that particular circuit parts, for example, a circuit part to which a high voltage is applied, are mounted on the auxiliary circuit board 33 such that the circuit parts mounted on the main circuit board 30 are separated from the particular circuit parts by the auxiliary circuit board 33. When the auxiliary circuit board 33 is adjacent to the rear wall 55 of the prong case 50, as shown in FIG. 2, a pair of auxiliary circuit rooms 6 accommodating the particular circuit parts are defined on both sides of the prong case 50, as shown in FIGS. 4A and 4B. Additionally, a switch 34 for starting and stopping the first charging operation and light-emitting diodes (LED) 35 for showing a charging condition of the rechargeable cells 40 are mounted on the upper surface 32 of the main circuit board 30, as shown in FIG. 4A. When a circuit pattern for the switch 34 and LED 35 is formed on the lower surface 31 of the main circuit board 30 adjacent to the auxiliary circuit rooms 6, the circuit parts in the auxiliary circuit room 6 are separated from the circuit pattern of the switch 34 and LED 35 by a pair of partition boards 56 projecting from a top wall 57 of the prong case 50, to thereby maintain a sufficient insulation distance therebetween. It is also preferred that the prongs 3 are connected to a predetermined circuit pattern on the main circuit board 30 by a pair of conductor strips 58 through the rear wall 55 of the prong case 50 and the auxiliary circuit board 33, such that an insulation distance between the conductor strips 58 and the circuit pattern on the main circuit board 30 can be stably maintained. The main circuit board 30 is disposed within the housing 10 such that the switch 34 can be turned ON/OFF by pushing a button 14 formed in the housing 10. The main circuit board 30, the cell case 60 and the prong case 50, etc., are fully assembled before accommodating them within the housing 10.

The terminal members 4 are electrically connected with the rechargeable cell 40, as shown in FIG. 5, and adapted to connect to a pair of output terminals 104 of the separate charger unit 100 for performing the second charging operation, and to a pair of input terminals(not shown) of the video camera 200 for supplying an electric current from the rechargeable cells 40 to the video camera 200. A bottom surface 21 of the bottom cover 20 is used as a mounting face of the battery pack 1 to the charger unit 100 or the video camera 200. Since the prong holes 22 and a pair of terminal holes 23 for the electrical connection between the terminal members 4 and the video camera 200 or the charger unit 100 are concentrated in the bottom surface 21 of the bottom cover 20, it will be appreciated that the battery pack 1 is safely used without exposing the terminal members 4 when the prongs 3 are connected to the power supply receptacle in the first charging operation, or exposing the prongs 3 when the battery pack 1 is mounted on the charger unit 100 in the second charging operation. In this embodiment, though the terminal members 4 are capable of acting as input terminals for receiving a charge current from the charger unit 100 and also output terminals for supplying an electric current from the rechargeable cells 40, it is also possible to form the input and output terminals individually in the battery pack 1. In addition, the bottom cover 20 is provided with hooks 24 in the respective corners thereof. When the battery pack 1 is fitted to the video camera 200, the hooks 24 are engaged with hook engaging portions(not shown) of the video camera 200 for tightly holding the battery pack 1 on the video camera 200. On the other hand, when the battery pack 1 is mounted on the charger unit 100 in the second charging operation, the hooks 24 are engaged with hook engaging portions 107 of the charger unit 100 for stably holding the battery pack 1 thereon. Additionally, the housing 10 of the battery pack 1 is provided with a pair of knurled portions 15 on the opposite side faces thereof as an non-slip grip of the battery pack 1.

As shown in FIG. 1B, the charger unit 100 comprises the charger circuit used for the second charging operation, a power code 102 having a conventional plug 103 at one end thereof, the output terminals 104, a switch 105 for starting and stopping the second charging operation and light-emitting diodes (LED) 106 for indicating a charging condition of the rechargeable cells 40, etc. The conventional plug 103 is adapted to connect to the power supply receptacle. The charge circuit of the charger unit 100 is designed such that a 10 charging rate of the rechargeable cells 40 by the second charging operation is faster than that by the first charging operation. Therefore, when a rapid charging operation of the battery pack 1 is desired, it is preferred to select the second charging operation. On the other hand, when the electric appliance is used, for example, during a journey, it is preferred to select the first charging operation because it is not necessary for carrying the charger unit 100 which is unhandy to carry during a journey.

Figure 6:
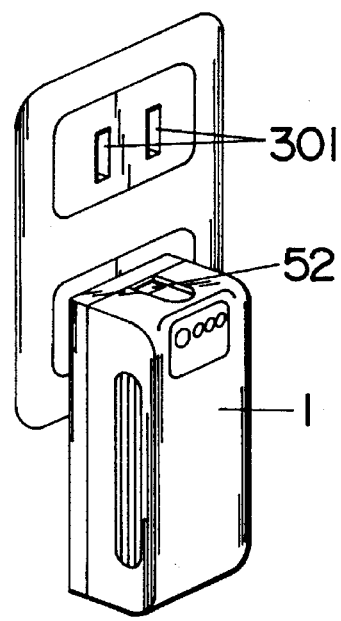
FIG. 6 is a perspective view of the battery pack in the first charging operation.
Figure 7:
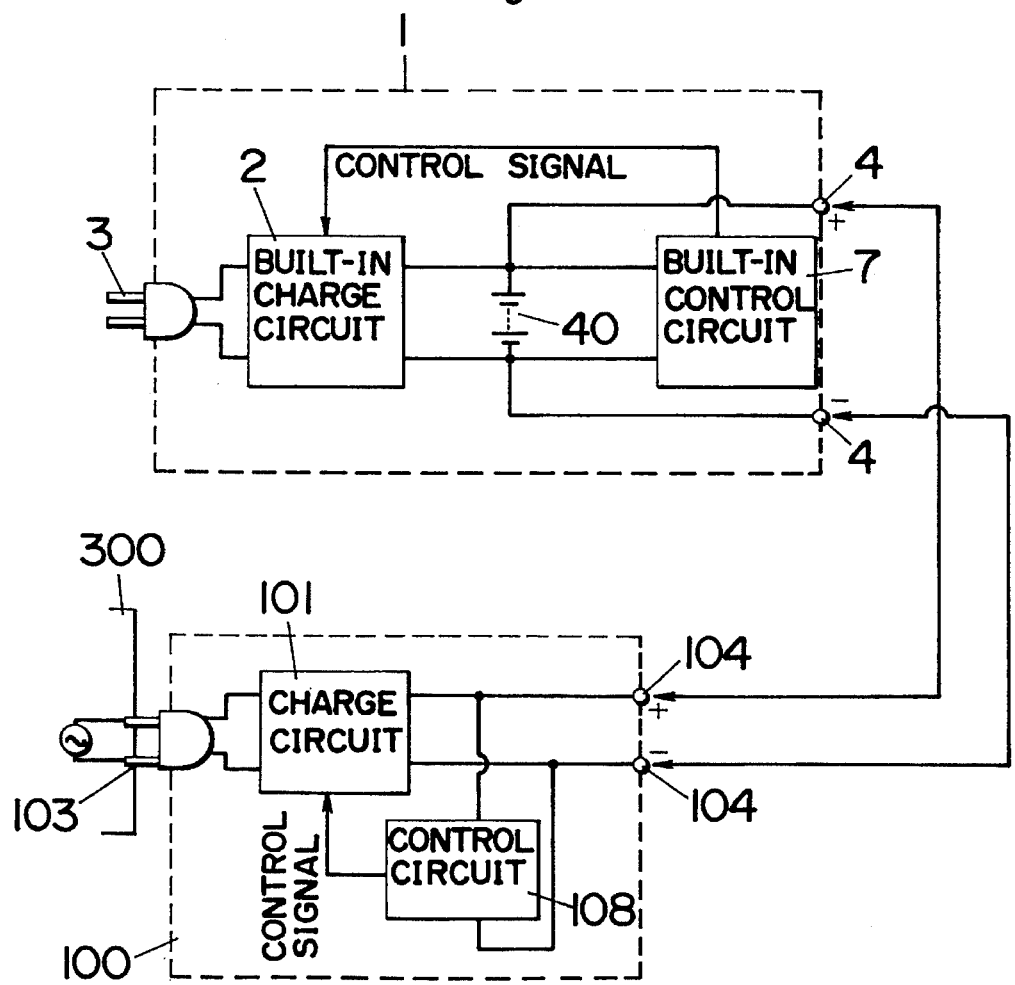
FIG. 7 is a circuit diagram for understanding a second charging operation of the battery pack with the use of the charger unit.

The first and second charging operations are explained, referring to the circuit diagrams of FIGS. 5 and 7. In the first charging operation, the prongs 3 of the battery pack 1 are connected to the power supply receptacle 301 to charge the rechargeable cells 40 through the built-in charge circuit 2, as shown in FIGS. 5 and 6. When the rechargeable cells 40 are fully charged by the first charging operation, a built-in control circuit 7 of the battery pack 1 outputs a control signal indicative of finishing the charging operation to the built-in charge circuit 2.

Figure 8:
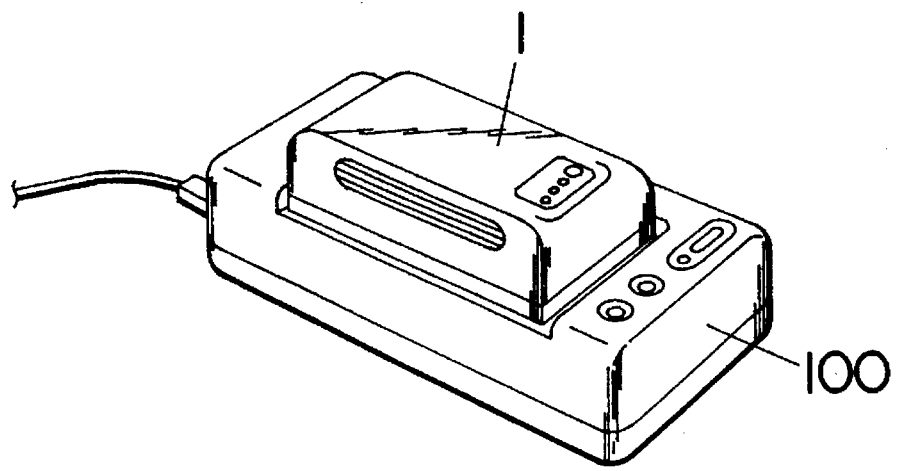
FIG. 8 is a perspective view of the battery pack in the second charging operation.

In the second charging operation, the battery pack 1 is mounted on the charger unit 100 such that the terminal members 4 of the battery pack 1 are connected to the output terminals 104 of the charger unit 100, as shown in FIG. 8. When the conventional plug 103 of the charger unit 100 is plugged in the power supply receptacle of the AC mains 300, the rechargeable cells 40 are charged through the charge circuit 101 of the charger unit 100, as shown in FIG. 7. In this arrangement, the retractable plug 3 of the battery pack 1 is in the retracted form. When the rechargeable cells 40 are fully charged by the second charging operation, a control circuit 108 of the charger unit 100 outputs a control signal indicative of finishing the charging operation to the charge circuit 101.

Figure 9:
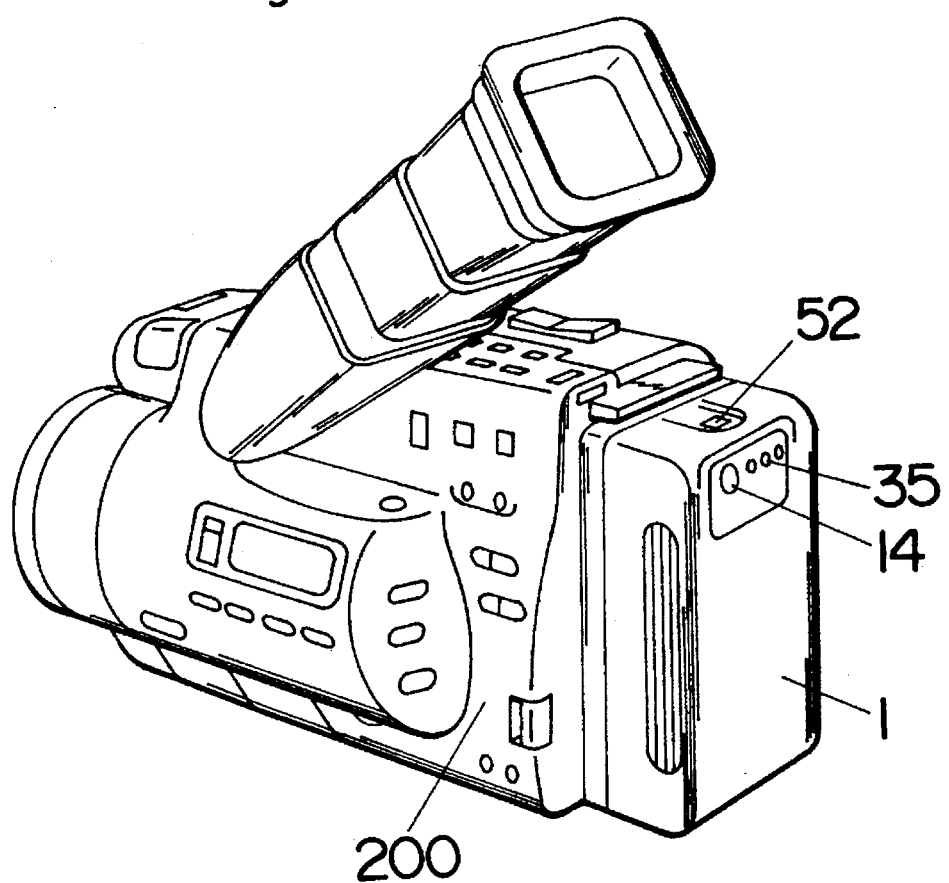
FIG. 9 is a perspective view of the battery pack fitted to the handy video camera.

The battery pack 1 charged by the first or second charging operation is fitted to a rear end of the video camera 300, as shown in FIG. 9.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A dual-charging system for a portable electric appliance comprising:

a battery pack for removably connecting to said electric appliance to energize said appliance, said battery pack having a housing which includes:

at least one rechargeable cell;

a first charge circuit with a first terminal for connecting to said appliance for supplying electric current from said rechargeable cell to said appliance;

a retractable plug for connecting to an AC mains for supplying said electric current to said first charge circuit to charge said rechargeable cell;

a holder for supporting said plug, said holder being accommodated in said housing such that said plug can be projected from or retracted into said battery pack;

a first circuit board disposed within said housing to carry a plurality of components forming said first charge circuit, said components being accommodated with said housing in a space surrounded by said at least one rechargeable cell, said first circuit board, and said holder;

a second circuit board extending from said first circuit board to separate said space from said holder, said plug being electrically connected to said first circuit board through said second circuit board; and a separate charger unit for detachably mounting said battery pack, said charger unit including a second charge circuit for connecting to a power source for producing a charging current, said second charge circuit having a second terminal for connecting to said first terminal to supply said charging current to said rechargeable cell by mounting said battery pack on said charger unit.

2. A dual-charging system as set forth in claim 1, wherein said second charge circuit produces said charging current which is greater than said electric current of said first charge circuit.

3. A dual-charging system as set forth in claim 1, wherein the housing of said battery pack has a mounting face which is placed upon said electric appliance and said charger unit respectively when said battery pack is mounted on said electric appliance and said charger unit, said retractable plug and said first terminal means being concentrated to said mounting face so as to be accessible through said mounting face.

4. A dual-charging system as set forth in claim 1, wherein said at least one rechargeable cell is a plurality of rechargeable cells accommodated in an L-shaped arrangement within said housing.

5. A dual-charging system as set forth in claim 4, wherein said housing also accommodates a cell case for holding said rechargeable cells therein.

6. A dual-charging system for a portable electric appliance comprising:

a battery pack for connecting to said electric appliance to energize said appliance, said battery pack having a housing which incorporates at least one rechargeable cell, a first charge circuit with a first terminal for supplying electric current from said rechargeable cell to said appliance, and a retractable plug for supplying said electric current from an AC mains to said first charge circuit to charge said rechargeable cell;

a separate charger unit for detachably mounting said battery pack, said charger unit including a second charge circuit for connecting to a power source for producing a charging current, said second charge circuit having a second terminal for supplying said charging current to said at least one rechargeable cell through said first terminal of said battery pack; and wherein said plug and said first terminal are both positioned on the same mounting face of said housing of said battery pack such that said plug can be connected to said AC mains through said mounting face, said first terminal being connected to said electric appliance when said electric appliance contacts with said mounting face, and said first terminal being connected to said second terminal when said charger unit contacts with said mounting face.

7. A dual-charging system as set forth in claim 6, wherein said second charge circuit produces said charging current which is greater than the electric current of said first charge circuit.

8. A dual-charging system as set forth in claim 6, wherein said plug is supported to a holder accommodated in the housing of said battery pack so as to project therefrom and retract therein, and wherein a first circuit board is disposed within said housing to carry a plurality of components forming said first charge circuit, a plurality of said rechargeable cells are accommodated within said housing in a L-shaped arrangement in such a manner as to leave within said housing a space which is surrounded by: (a) the rechargeable cells, (b) said circuit board, and (c) said holder and in which said components are accommodated.

9. A dual-charging system as set forth in claim 8, further including an additional circuit board extending from said first circuit board to separate said space from said holder, said plug being electrically connected to said first circuit board through said additional circuit board.

* * * * *